(12) United States Patent
Zheng (10) Patent No.: US 8,854,842 B2
(45) Date of Patent: Oct. 7, 2014

(54) DIGITAL COMMUNICATION LINK BETWEEN SECONDARY SIDE AND PRIMARY SIDE OF SWITCHING POWER CONVERTER

(71) Applicant: iWatt Inc., Campbell, CA (US)

(72) Inventor: Junjie Zheng, Santa Clara, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 13 days.

(21) Appl. No.: 13/711,374

(22) Filed: Dec. 11, 2012

(65) Prior Publication Data

US 2014/0160810 A1    Jun. 12, 2014

(51) Int. Cl.
    *H02M 3/335* (2006.01)
(52) U.S. Cl.
    CPC ............................ *H02M 3/33576* (2013.01)
    USPC ...................... 363/21.13; 363/21.16
(58) Field of Classification Search
    USPC ............ 363/21.05, 21.07, 21.08, 21.1, 21.13, 363/21.15, 21.16, 21.18, 97; 323/283
    See application file for complete search history.

(56) References Cited

U.S. PATENT DOCUMENTS

| | | | |
|---|---|---|---|
| 7,719,860 B2 | 5/2010 | Usi | |
| 7,821,797 B2* | 10/2010 | Nishiyama et al. | 363/17 |
| 7,864,546 B2* | 1/2011 | Dhuyvetter et al. | 363/17 |
| 8,125,799 B2 | 2/2012 | Zhu et al. | |
| 2008/0157743 A1 | 7/2008 | Martin et al. | |
| 2009/0015227 A1 | 1/2009 | Wong et al. | |
| 2009/0059632 A1 | 3/2009 | Li et al. | |
| 2009/0230930 A1 | 9/2009 | Jain et al. | |
| 2009/0279334 A1 | 11/2009 | Xiong et al. | |
| 2010/0164455 A1 | 7/2010 | Li et al. | |
| 2012/0081927 A1* | 4/2012 | Matsumoto | 363/21.05 |

* cited by examiner

*Primary Examiner* — Gary L Laxton
(74) *Attorney, Agent, or Firm* — Fenwick & West LLP (57) ABSTRACT

A switching power converter provides a communication link between a secondary side and a primary side of the switching power converter. During a messaging mode, the communication link enables information to be transmitted from an electronic device coupled to the secondary side to a controller on the primary side. The communication link may be used to transmit operating parameters related to powering the electronic device. The switching power converter may then adapt its switching operation to achieve different regulated output voltage and/or current to accommodate the detected electronic device.

22 Claims, 5 Drawing Sheets

DIGITAL COMMUNICATION LINK BETWEEN SECONDARY SIDE AND PRIMARY SIDE OF SWITCHING POWER CONVERTER

FIELD OF THE INVENTION

The present invention relates to a power converter and more particularly to transmitting digital messages between a secondary side and a primary side of a switching power converter.

DESCRIPTION OF THE RELATED ARTS

An isolated switching power converter provides regulated power to an electronic device while providing galvanic isolation between the electronic device and an AC power source. For example, in a conventional flyback power converter, a power stage includes a power transformer and a switch. A switch controller coupled to the switch controls the on-times and off-times of the switch based on a feedback signal representing the output power, output voltage or output current. Energy is transferred from the primary side of the power transformer to a secondary side of the power transformer based on a duty cycle of the switching cycles in order to maintain a regulated output voltage and/or output current to the electronic device.

In a conventional switching power converter, the regulated output voltage and/or current is generally predefined to match a specific set of load requirements for the electronic device. As a result, power supplies designed for use with one electronic device are typically incompatible with other electronic devices that may have different load characteristics. Thus, many conventional electronic devices are sold together with a dedicated power supply, thereby increasing the cost of the electronic device to the consumer.

SUMMARY OF THE INVENTION

A switching power converter provides regulated power to an electronic device and enables digital communication from the electronic device on a secondary side to a switch controller on a primary side. A transformer includes a primary winding coupled to an input and a secondary winding coupled to an output of the switching power converter. The transformer electrically isolates the primary side of the switching power converter corresponding to the primary winding and the secondary side of the switching power converter corresponding to the secondary winding. A secondary side controller on the secondary side of the switching power converter is configured to cause a sequence of voltage pulses across the secondary side winding of the switching power converter representing a digital message encoding one or more control parameters. In one embodiment, the secondary side controller causes the sequence of voltage pulses by controlling switching of a switch coupled to the secondary side winding. When the switch is turned on, the switch allows current flow through the secondary winding, and when the switch is turned off, the switch prevents current flow through the secondary winding. These changes in current through the secondary side winding cause the sequence of voltage pulses across the secondary side winding representing the digital message.

A primary side switch coupled to the primary winding of the transformer allows current flow through the primary winding of the transformer when the primary side switch is turned on and prevents current flow through the primary winding of the transformer when the primary side switch is turned off. A primary side controller on the primary side of the switching power converter detects the sequence of voltage pulses encoding the digital message. In one embodiment, the primary side controller detects the sequence of voltage pulses via primary side sensing. The primary side controller then generates a primary side control signal to control switching of the primary side switch based on the control parameters in the digital message.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

A switching power converter provides a communication link between a secondary side and a primary side of the switching power converter. During a messaging mode, the communication link enables information to be transmitted from an electronic device coupled to the secondary side to a controller on the primary side. In one embodiment, the communication link is realized without compromising the galvanic isolation between the primary and secondary sides of the power supply and without utilizing an isolation device such as opto-isolator that would add substantially to the cost and complexity of the switching power supply.

In one embodiment, the secondary-to-primary communication link is used to enable the switch controller to perform various functions, including but not limited to 1) detecting the specific electronic device that is connected to the power supply, and 2) determining the operational characteristics of a connected electronic device including, for example, the operating voltage level, current level, and/or current operating mode (e.g., shut-down mode, sleep mode, hibernation mode, etc.). The switching power converter may then adapt its switching operation to achieve different regulated output voltage and/or current to accommodate the detected electronic device and/or its operating mode. Thus, the switching power converter can accommodate a wide variety of different electronic devices.

Figure 1:
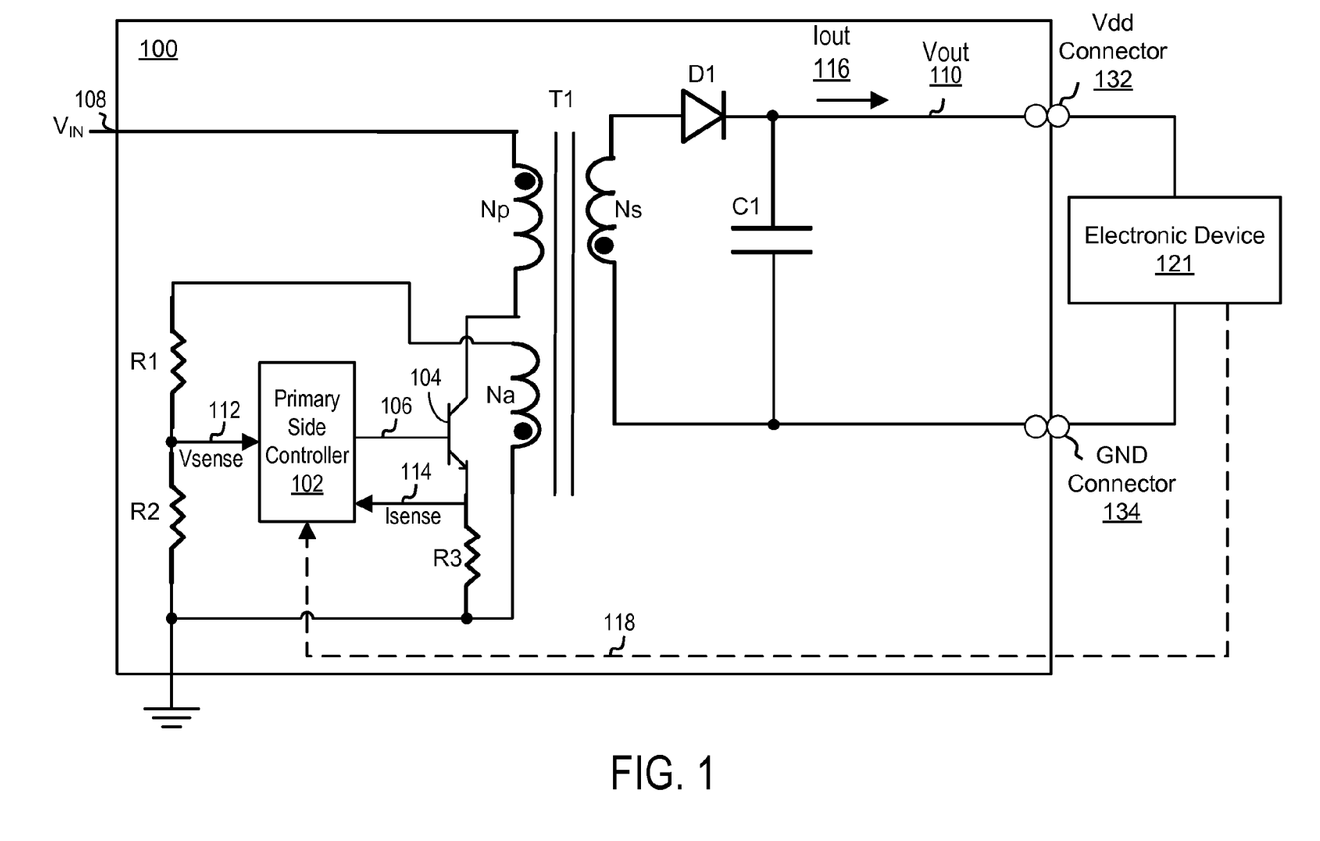
FIG. 1 is a circuit diagram illustrating a first embodiment of a switching power converter.

FIG. 1 is a circuit diagram illustrating an embodiment of a switching power converter 100 (e.g., a primary-side fly-back switching power converter) providing power to an electronic device 121 via a Vdd connector 132 and a GND connector 134. The switching power converter 100 includes, among other components, a transformer T1 having a primary winding Np, a secondary winding Ns, and an auxiliary winding Na, a switch 104 (e.g., a transistor), a switch controller 102, an output rectifier diode D1, resistors R1, R2, R3, and output filter capacitor C1.

An input voltage ($V_{IN}$) 108, typically a rectified AC voltage, is input to power converter 100. Primary side controller 102 controls the on state and the off state of switch 104 using switch control signal 106 with on-times ($T_{ON}$) and off-times ($T_{OFF}$). Switch control signal 106 may control switching of switch 104 using, for example pulse width modulation (PWM) or pulse frequency modulation (PFM).

When switch 104 is turned on during its on-time, energy is stored in primary side windings Np of transformer T1. The voltage across secondary winding Ns is negative and diode D1 is reverse biased, blocking transfer of energy to electronic device 121. In this state, energy is supplied to electronic device 121 via capacitor C1. When switch 104 is turned off, the energy stored in primary winding Np of transformer T1 is released to the secondary winding Ns of transformer T1. Diode D1 becomes forward biased enabling transfer of energy stored in transformer T1 to electronic device 121 and re-charging capacitor C1.

Resistors R1 and R2 form a voltage divider coupled in series with auxiliary winding Na of transformer T1, and produce sensed voltage ($V_{SENSE}$) 112, which is representative of output voltage ($V_{OUT}$) 110. Resistor R3 is coupled in series with switch 104 to produce a voltage ($I_{SENSE}$) 114 representative of output current $I_{OUT}$ 116 through electronic device 121 (because the current through primary winding Np will be substantially proportional to the current through secondary winding Ns).

In normal operation, controller 102 monitors $V_{SENSE}$ 112 and $I_{SENSE}$ 114 and controls switching of switch 104 to maintain a regulated output. For example, in a constant voltage mode (CVM), controller 102 controls switching of switch 104 to maintain $V_{OUT}$ 110 substantially near a desired regulation voltage $V_{REG}$ (for example, within an allowable error range). In a constant current mode (CCM), controller 102 controls switching of switch 104 to maintain $I_{OUT}$ 116 substantially near a desired regulation current $I_{REG}$ (for example, within an allowable error range).

Primary side auxiliary winding Na of power transformer allows for a low voltage $V_{SENSE}$ 112 to be generated because the voltage can be scaled down based on the turn ratio of the secondary winding Ns and auxiliary winding Na. However, in an alternative embodiment, auxiliary winding Na may be omitted, and $V_{SENSE}$ may instead be detected by directly monitoring the voltage across primary winding Np.

A communication link 118 enables information to be communicated from electronic device 121 on the secondary side to controller 102 on the primary side. For example, communication link 118 enables controller 102 to detect information about the electronic device 121 such as, for example, the regulation parameters associated with electronic device 121 and/or an operating mode associated with the electronic device 121. Based on the detected information, controller 102 may adjust switching of switch 104 to achieve different output characteristics to achieve, for example, a particular output voltage, a particular output current, a particular output power, or to implement particular protection modes associated with the electronic device 121. For example, in one embodiment, the communication link 118 may communicate information that enables the controller 102 to determine that a voltage of the electronic device 121 has risen (or is in danger of rising) above its upper design limit, thereby causing the controller 102 to implement an overvoltage protection mode. In another example, the communication link 118 may communicate information that enables the controller 102 to determine that a short-circuit is present in the electronic device 121, thereby causing the controller 102 to implement a short-circuit protection mode.

Communication link 118 is illustrated in FIG. 1 as a dashed line because it represents a conceptual communicative path between electronic device 121 and the controller 102, but may not necessarily be a direct coupling between the electronic device 121 and controller 102. This link 118 can be implemented in a variety of different ways. In one embodiment, communication link 118 is implemented via an optocoupler or other device that maintains electrical isolation between the secondary side and primary side of switching power converter 100. However, such devices are often undesirable in that they add substantially to the complexity and cost of switching power converter 100. Thus, in other embodiments, communication link 118 is implemented without any specialized isolation devices (such as optocouplers), while still preserving galvanic isolation between the primary and secondary sides of switching power converter 100. For example, in one embodiment, communication link 118 is implemented by generating a secondary side signal encoding a digital message and detecting the signal on the primary side via a primary side sensing mechanism. In this embodiment, the digital message may be transmitted during a messaging mode of switching power converter 100 in between on-times of switch 104. Examples of switching power converters that enable communication link 118 via primary side sensing are described in further detail below with reference to FIGS. 2-4.

Figure 2:
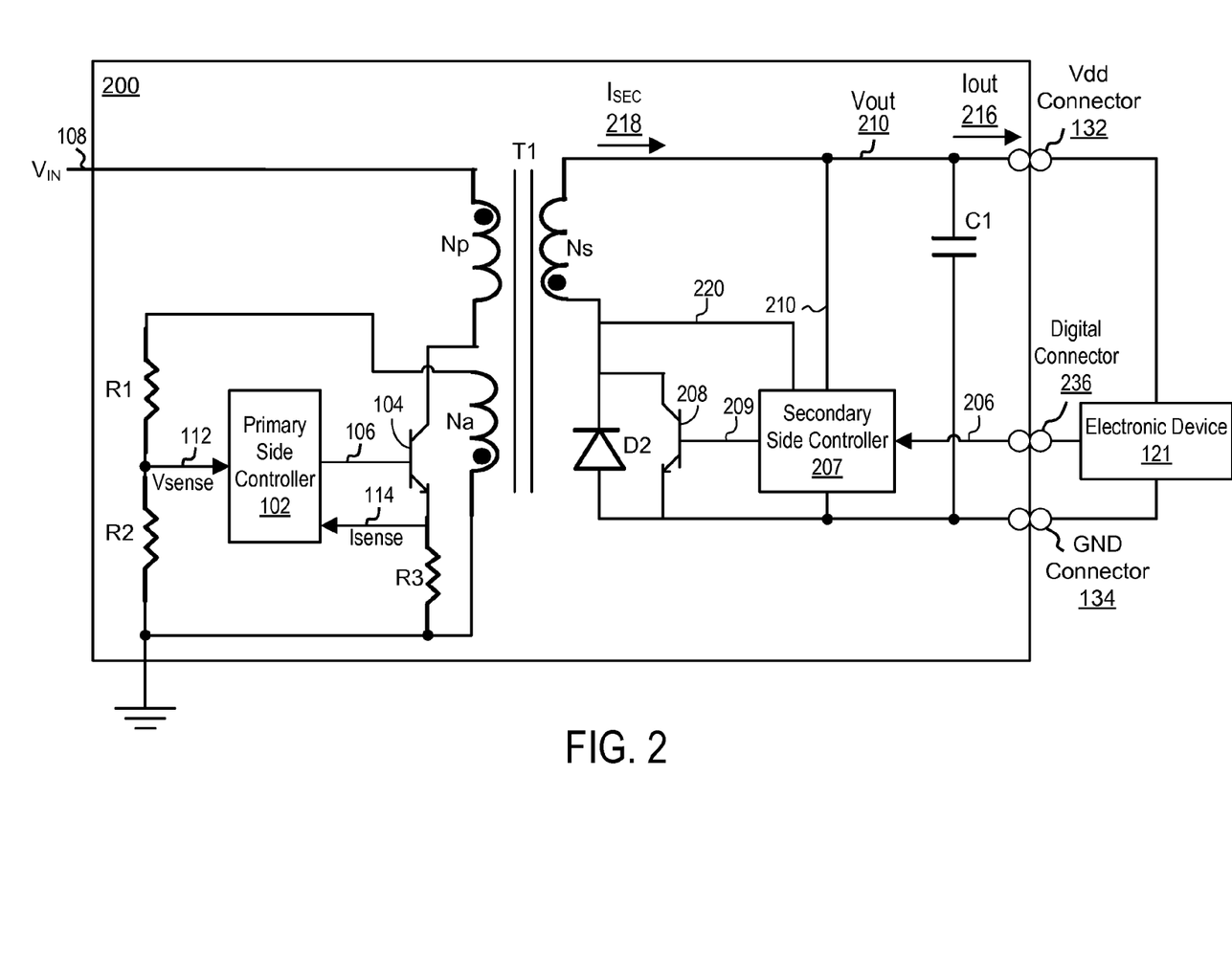
FIG. 2 is a circuit diagram illustrating a second embodiment of a switching power converter.

FIG. 2 is a block diagram of a switching power converter 200 providing power to an electronic device 121 and enabling secondary-to-primary digital communication via primary side sensing. In this embodiment, primary side components (e.g., primary side controller 102, switch 104, resistors R1, R2, R3, primary winding Np, and auxiliary winding Na) operate as described above with respect to FIG. 1. However, a modified secondary side architecture is illustrated to enable digital communication to the primary side during a messaging mode of the switching power converter while maintaining galvanic isolation.

Particularly, the secondary side architecture of switching power converter 200 includes a secondary side controller 207 that receives a device signal 206 from electronic device 121 via a digital connector 236. Digital connector 236 may comprise, for example, one or more data pins on a Universal Serial Bus (USB) (or similar type connector) between switching power converter 200 and electronic device 121 that also includes Vdd connector 132 and GND connector 134. In alternative embodiments, other types of connectors may be used to provide both power and digital communication between the electronic device 121 and switching power converter 200 via connectors 132, 236, 134.

In one embodiment, device signal 206 represents one or more control parameters associated with the particular electronic device 121 and/or an operating mode associated with the electronic device 121. The control parameters may include, for example, output voltage, output current, output power, and protection modes appropriate for powering the electronic device 121. Alternatively, device signal 206 may represent some other information from which the appropriate control parameters can be derived. For example, device signal 206 may comprise an identifier of the electronic device 121 that the secondary side controller 207 can use to determine the control parameters. In one embodiment, device signal 206 may be provided in response to a query signal sent from secondary side controller 207 via digital connector 236.

During a messaging mode of the switching power converter 200, secondary controller 207 generates switch control signal 209 for controlling switching of a secondary side switch 208 based on the device signal 206. For example, in one embodiment, control signal 209 encodes a digital message based on a sequence of on or off periods, where, for example, an on period represents a first logic state and an off period represents a second logic state. Alternatively, a different encoding scheme may be used such as, for example, encoding a first logic state by generating two pulses within predefined threshold time period of each other, and encoding a second logic state by generating a single pulse (without generating a second pulse within the predefined time period).

The on and off switching of switch 208 causes voltage fluctuations across secondary winding Ns that approximately follow the sequence of on and off periods of control signal 209. These voltage fluctuations across the secondary winding Ns of power transformer 202 are furthermore transferred to the primary winding Np of power transformer 202 and to the auxiliary winding Na, thus transferring a representation of the digital message to the primary side. The primary-side controller 102 detects the voltage fluctuations across auxiliary winding Na via $V_{SENSE}$ 112 and can interpret the sequence of on and off periods to decode the digital message. Based on the determined control parameters in the digital message, primary-side controller 201 controls switching of switch 104 in order to match the specific regulation parameters and/or operating mode associated with the electronic device 121.

Connection Vout 210 provides the power to operate secondary controller 207. The secondary side of switching power converter 200 also includes a diode D2 in parallel with switch 208 (instead of the diode D1 in the output path of FIG. 1). Particularly, by placing diode D2 in parallel with switch 208 (instead of in series), diode D2 does not impede current flow from Vout 210 through secondary winding Ns and switch 208 when switch 208 is turned on. This configuration enables the secondary side of switching converter 200 to operate similarly to the flyback converter of FIG. 1 when in normal operating mode (i.e., not in messaging mode) while also enabling switch 208 to generate the voltage pulses across secondary winding Ns during messaging mode.

In normal operating mode, when switch 104 is turned on during its on-time, energy is stored in the primary side windings Np of transformer T1. The voltage across the secondary winding Ns is negative and the diode D2 is reverse biased. During normal operating mode, secondary side controller 207 detects when diode D2 is reverse biased and turns off switch 208. For example in one embodiment, secondary side controller 207 compares diode voltage signal 220 to a turn off threshold and determines that diode D2 is reverse biased when diode voltage signal 220 exceeds the turn off threshold. Thus, switch 208 generally turns off when diode D2 turns off in the normal operating mode.

When switch 104 is turned off, the energy stored in the primary windings Np of transformer T1 is released to the secondary side Ns of transformer T1 and the voltage across secondary winding Ns becomes positive. Diode D2 becomes forward biased enabling transfer of energy stored in the transformer Ti to electronic device 121 and re-charging capacitor C1. During normal operating mode, secondary side controller 207 detects when diode D2 becomes forward biased and turns on switch 208. For example in one embodiment, secondary side controller 207 compares diode voltage signal 220 to the turn off threshold and determines that diode D2 is forward biased when diode voltage signal 220 falls below the turn off threshold. Thus, switch 208 generally turns on when diode D2 turns on in the normal operating mode.

In one embodiment, the messaging mode of switching power converter 200 occurs when switch 104 is turned off and the transformer T1 has been fully reset. Here, diode D2 is reverse biased, but can be bypassed by turning on switch 208, thereby generating the voltage pulses across secondary winding Ns.

Figure 3:
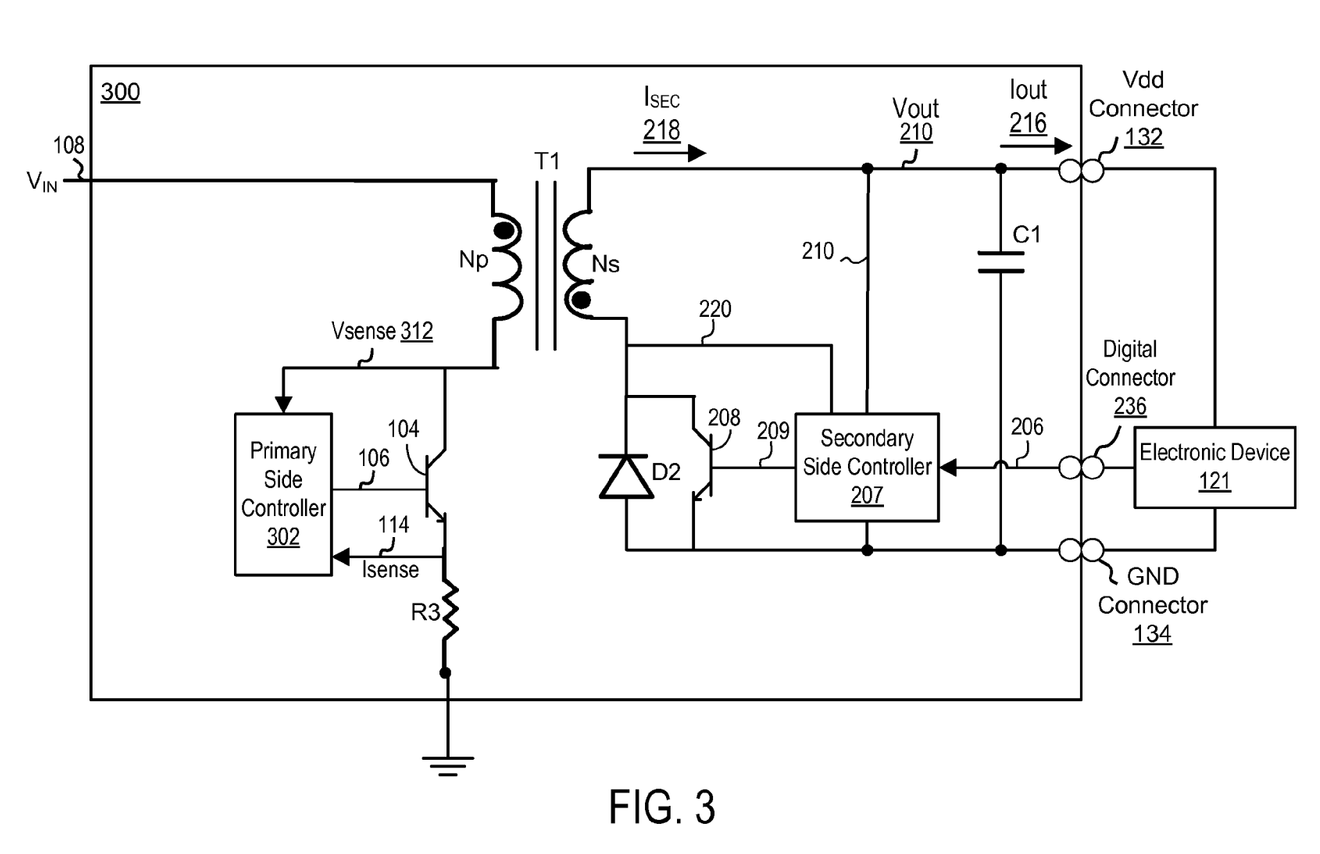
FIG. 3 is a circuit diagram illustrating a third embodiment of a switching power converter.

FIG. 3 illustrates an alternative embodiment of a switching power converter 300. Switching power converter 300 is similar to switching power converter 200 of FIG. 2, but omits auxiliary winding Na and voltage divider resistors R1, R2. Instead, in this embodiment, a primary side controller 302 senses voltage signal $V_{SENSE}$ 312 directly from primary winding Np. Primary side controller 302 can then operate similarly to primary side controller 102 of FIG. 2, but uses a different scaling factor in approximating $V_{OUT}$ 210 from $V_{SENSE}$ 312 to account for the higher relative voltage across primary winding Np compared to auxiliary winding Na. In one embodiment, primary side controller 302 differs from primary side controller 102 in that it may include high voltage I/O capabilities in order to directly monitor $V_{SENSE}$ 312, which is typically a high voltage signal.

Figure 4:
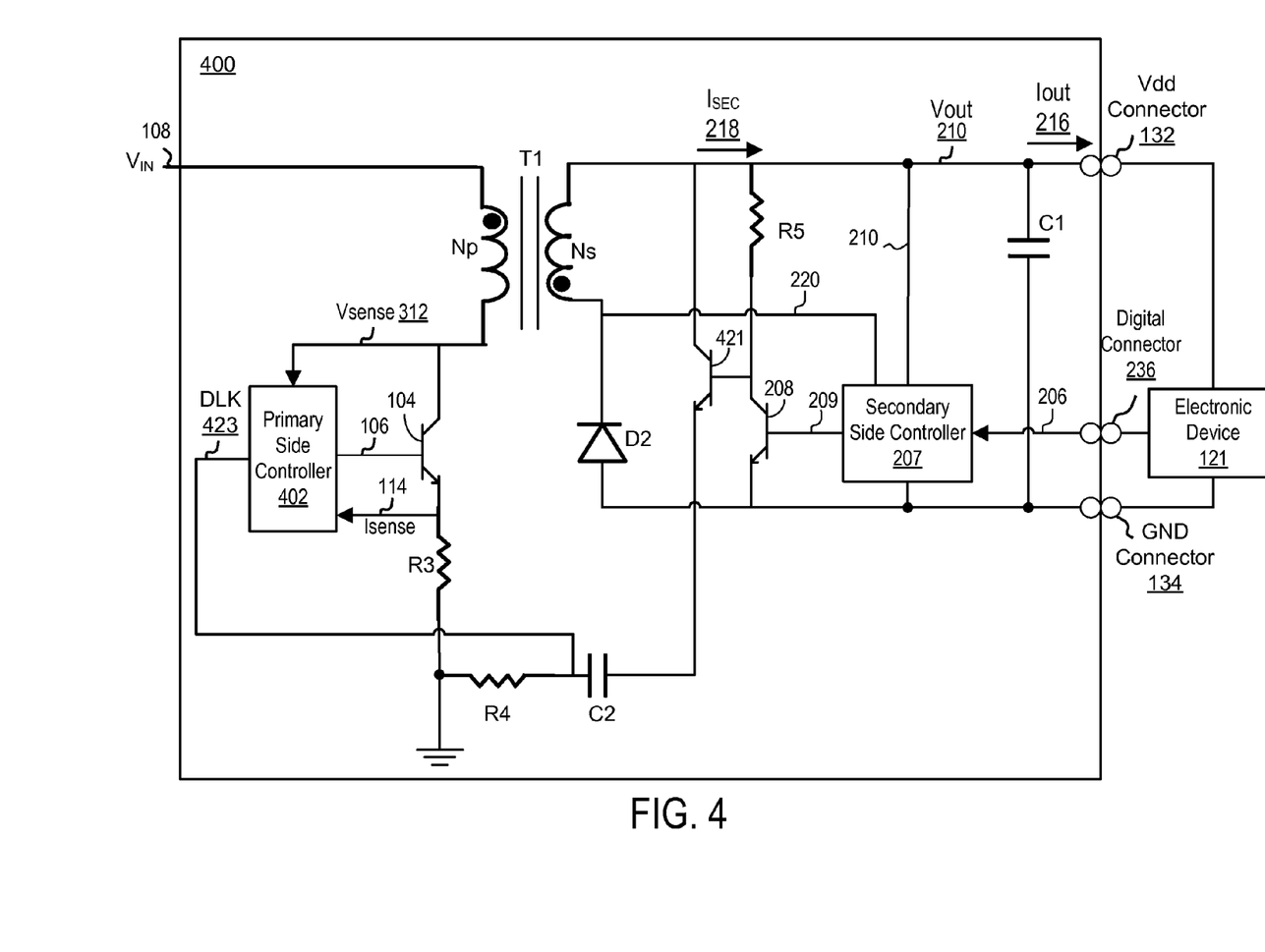
FIG. 4 is a circuit diagram illustrating a fourth embodiment of a switching power converter.

FIG. 4 illustrates another alternative embodiment of a switching power converter 400. Switching power converter 400 is similar to switching power converter 300 of FIG. 3, but includes a resistor R4 and a coupling capacitor C2 that provides dielectric isolation across the primary-to-secondary boundary in order to suppress conducted and radiated electromagnetic interference EMI. Furthermore, switching power converter 400 includes a resistor R5 in series with switch 208 and includes a second switch 221 on the secondary side between Vout 210 and capacitor C2.

In this embodiment, secondary side controller 207 operates according to similar principles as described above during the messaging mode to provide a drive signal to turn transistor 208 on and off in a manner that encodes the digital message. When switch 208 turns on, the collector voltage drops and causes switch 421 to turn off. Similarly, switch 208 turns off the collector voltage rises causing switch 421 to turn on. Thus, switch 421 turns on and off in a similar but inverted pattern relative to switch 208. Switching of transistor 421 causes voltage fluctuations across capacitor C2 and resistor R2, which can be sensed by switch controller 302 via digital link input (DLK) 423. Switch controller 402 can decode the digital message based on the sensed pattern.

Figure 5:
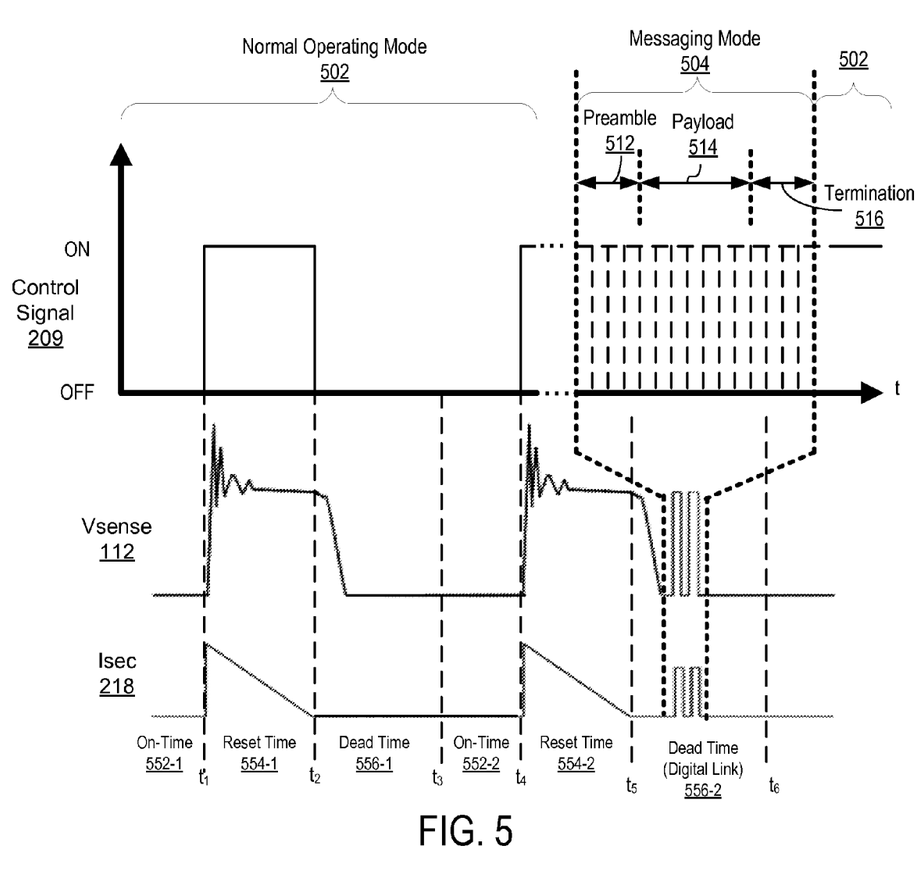
FIG. 5 illustrates current and voltage signals for a switching power converter in a normal operating mode and a messaging mode.

FIG. 5 illustrates operating waveforms produced by an embodiment of switching converter 200. While operation is discussed in the context of switching power converter 200 of FIG. 2, similar operating principles also apply to switching converter 300 of FIG. 3 and switching converter 400 of FIG. 4. In the illustrated embodiment, switching converter 200 can operate in either a normal operating mode 502 or a messaging mode 504. In the normal operating mode 502, secondary side controller 207 turns on switch 208 when voltage 220 is below the turn off threshold which indicates that diode D2 is forward biased. Secondary side controller 207 turns off switch 208 when voltage 220 is above the turn off threshold which indicates that diode D2 is reverse biased. Primary side controller 102 operates to maintain regulated output power as described above with respect to FIG. 1.

During normal operating mode 502, switching converter 200 transitions between an on-time 552-1 (when primary side switch 104 is turned on), a reset time 554-1 (between a time $t_1$ when primary side switch 104 is turned off and a time $t_2$ when the secondary current $I_{SEC}$ reaches zero (or falls below a low threshold)), and a dead time 556-1 (between time $t_2$ when the secondary current $I_{SEC}$ reaches zero (or falls below a low threshold) and a time $t_3$ when primary side switch 104 is turned back on). These operating states repeat for each subsequent switching cycle as illustrated by on-time 552-2, reset time 554-2, and dead time 556-2.

When primary side switch 104 is on during on-times 552, current through primary winding Np increases approximately linearly and $V_{SENSE}$ and $I_{SEC}$ are approximately zero because diode D2 is reverse biased. Thus, energy is stored in transformer T1 but is not delivered to the electronic device 121. When primary side switch 104 turns off at time $t_1$, diode D2 becomes forward biased, and switch 208 is turned on. As energy stored in transformer T1 is delivered to the secondary side, secondary output current $I_{SEC}$ spikes up and then starts to ramp down approximately linearly. $V_{SENSE}$ 112 also spikes up and then slowly ramps down. When $I_{SEC}$ reaches zero (or falls below a threshold near zero) at time $t_2$, switch 208 is turned off and voltage $V_{SENSE}$ rapidly falls down to zero because capacitor C1 loses its charge. The cycle continues when switch 104 turns back on at time $t_3$, thus beginning the next on-time 552-2.

When switching power converter 200 is in messaging mode 504, the digital message may be generated and transferred during the dead time after the transformer is reset (e.g., after reset time 554-2). For example, in the illustrated embodiment, the digital message is sent during dead time 556-2. Here, secondary side controller 207 turns secondary side switch 208 on and off to generate current pulses in $I_{SEC}$ encoding the digital message. These current pulses generate voltage pulses across secondary winding Ns, which is transferred to the primary side and sensed via $V_{SENSE}$ 112 as described above. Thus, the dead time of the switching cycle may be used to transmit the digital data without interfering with general operation of switching power converter 200.

In one embodiment of the messaging mode 504, secondary side controller 207 controls secondary side switch 208 to switch on and off according to a sequence of logic states that encodes a digital message for communicating to the primary controller 102. In one embodiment, the digital message may include a preamble 512, a payload 514, and a termination 516. Each component of the digital message includes one or more bits controlled by switching of switch 208 on (e.g., to generate a logic high bit) or off (e.g., to generate a logic low bit). In one embodiment, preamble 512 encodes header information that can be recognized by primary side controller 102 as indicating a start of a data transmission so that primary side controller 102 can prepare for receipt of the transmission. Furthermore, the preamble 512 may encode information such as, for example, the length of the payload, a type of transmission, etc. The payload 514 encodes data to be communicated to primary side controller 102. This may include, for example, a digital representation of control parameters such as voltage, current, operation mode, etc. for providing power to the electronic device 121. Termination 516 may be provided to indicate completion of the digital message. As will be apparent, different encoding techniques other than the example described may be used to generate the digital communication between secondary side controller 207 and primary side controller 102. Once the complete message has been sent, switching converter 200 returns to normal operation 502 and transistor 208 is placed in the on state.

Different messaging techniques may be desirable based on different duty cycles of switching power converter 200. For example, in one embodiment, where the dead time of switch 104 in each switching cycle is very short, messaging mode 504 may accommodate only a small number of bits (e.g., 1-2 bits) per switching cycle of switch 104. In other cases where the dead time of switch 104 is relatively long, messaging mode 504 may accommodate a large number of bits (e.g., 100 bits) per switching cycle. As will be apparent, different portions of a digital message may be transmitted during different switching cycles and then concatenated by switch controller 102 to generate a complete message.

Upon reading this disclosure, those of skill in the art will appreciate still additional alternative designs for digital communication in a switching power converter. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

The invention claimed is:

1. A switching power converter for providing regulated power to an electronic device, the switching power converter comprising:
    a transformer including a primary winding coupled to an input and a secondary winding coupled to an output of the switching power converter;
    a secondary side controller on the secondary side of the switching power converter, the secondary side controller configured to cause a sequence of voltage pulses across the secondary winding of the switching power converter representing a digital message encoding one or more control parameters;
    a primary side switch coupled to the primary winding of the transformer, wherein the primary side switch allows current flow through the primary winding of the transformer when the primary side switch is turned on, and wherein the primary side switch prevents current flow through the primary winding of the transformer when the primary side switch is turned off; and
    a primary side controller on the primary side of the switching power converter, the primary side controller configured to detect the sequence of voltage pulses encoding the digital message, and to generate a primary side control signal to control switching of the primary side switch based on the one or more control parameters in the digital message.

2. The switching power converter of claim 1, further comprising:
    a secondary side switch coupled to the secondary winding of the transformer, wherein the secondary side switch allows current flow through the secondary winding of the transformer when the secondary side switch is turned on, and wherein the secondary side switch prevents current flow through the secondary winding of the transformer when the secondary side switch is turned off, wherein the secondary side controller controls switching of the secondary side switch via a secondary side control signal such that a sequence of on and off times of the secondary side switch represent the digital message encoding the one or more control parameters.

3. The switching power converter of claim 1, further comprising:
a voltage sensing circuit on the primary side of the switching power converter, the voltage sensing circuit sensing a primary side signal representative of the sequence of voltage pulses encoding the digital message,
wherein the primary side controller detects the sequence of voltage pulses via the primary side signal.

4. The switching power converter of claim 3, wherein the voltage sensing circuit comprises:
an auxiliary winding of the transformer on the primary side of the switching power converter to generate the primary side signal, the primary side signal being substantially proportional to the sequence of voltage pulses across the secondary side winding encoding the digital message.

5. The switching power converter of claim 3, wherein the voltage sensing circuit comprises:
the primary winding of the transformer generating the primary side signal, the primary side signal being substantially proportional to the sequence of voltage pulses across the secondary side winding encoding the digital message.

6. The switching power converter of claim 3, wherein the voltage sensing circuit comprises:
a coupling capacitor coupled between the secondary side winding and the primary side winding, the coupling capacitor generating the primary side signal on the primary side of the coupling capacitor based on the sequence of voltage pulses encoding the digital message.

7. The switching power converter of claim 1, further comprising:
a secondary side diode coupled in parallel with a secondary side switch and in series with the secondary winding, the secondary side diode becoming forward biased to conduct current when the primary side switch is off, and the secondary side diode becoming reverse biased to block current when the primary side switch is on.

8. The switching power converter of claim 7, wherein the secondary side controller is further configured to sense a voltage across the secondary side diode, turn on the secondary side switch when the voltage across the secondary side diode is below a turn off threshold voltage, and turn off the secondary side switch when the voltage across the secondary side diode is above the turn off threshold.

9. The switching power converter of claim 7, wherein the secondary side diode is bypassed by the secondary side switch during a messaging mode when the secondary side controller causes the sequence of voltage pulses across the secondary side winding.

10. The switching power converter of claim 1, wherein the secondary side controller generates the sequence of voltage pulses across the secondary side winding of the switching power during a dead time in a switching cycle of the switching power converter.

11. The switching power converter of claim 1, wherein the one or more control parameters comprise at least one of: an output voltage, an output current, an output power, a protection mode, and an operating mode.

12. The switching power converter of claim 1, wherein the one or more control parameters comprise electrical characteristics of the electronic device.

13. The switching power converter of claim 1, wherein the secondary side controller causes a pair of voltage pulses to be generated across the secondary winding within a predefined time period to represent a first logic state and wherein the secondary side controller causes a single voltage pulse to be generated across the secondary winding to represent a second logic state.

14. A method for controlling a switching power converter, the switching power converter including a transformer with a primary winding coupled to an input and a secondary winding coupled to an output of the switching power converter, and a primary side switch coupled to the primary winding of the transformer, the transformer electrically isolating a primary side of the switching power converter corresponding to the primary winding and a secondary side of the switching power converter corresponding to the secondary winding, the primary side switch controlled by a primary side controller, the method comprising;
receiving by a secondary side controller on the secondary side of the switching power converter, operating parameters of an electronic device coupled to the secondary side of the switching power converter;
encoding the operating parameters as a digital message;
operating the secondary side controller to cause a sequence of voltage pulses across the secondary side winding of the switching power converter representing the digital message;
detecting the sequence of voltage pulses encoding the digital message by the primary side controller using primary side sensing; and
generating, by the primary side controller, a primary side control signal to control switching of the primary side switch based on one or more control parameters in the digital message.

15. The method of claim 14, wherein operating the secondary side controller comprises:
controlling switching of a secondary side switch coupled to the secondary winding of the transformer via a secondary side control signal such that a sequence of on and off times of the secondary side switch represent the digital message encoding the one or more control parameters, wherein the secondary side switch allows current flow through the secondary winding of the transformer when the secondary side switch is turned on, and wherein the secondary side switch prevents current flow through the secondary winding of the transformer when the secondary side switch is turned off.

16. The method of claim 14, wherein detecting the sequence of voltage pulses encoding the digital message by the primary side controller using primary side sensing comprises:
detecting the sequence of voltage pulses via an auxiliary winding of the transformer on the primary side of the switching power converter.

17. The method of claim 14, wherein detecting the sequence of voltage pulses encoding the digital message by the primary side controller using primary side sensing comprises:
detecting the sequence of voltage pulses via the primary winding of the transformer on the primary side of the switching power converter.

18. The method of claim 14, wherein detecting the sequence of voltage pulses encoding the digital message by the primary side controller using primary side sensing comprises:

detecting the sequence of voltage pulses via a coupling capacitor coupled across the primary and secondary side windings of the transformer.

19. The method of claim 14, wherein operating the secondary side controller comprises:
causing the sequence of voltage pulses across the secondary side winding of the switching power converter representing the digital message during a dead time in a switching cycle of the switching power converter.

20. The method of claim 14, further comprising:
sensing a voltage across a secondary side diode in parallel with a secondary side switch;
turning on the secondary side switch when the voltage across the secondary side diode is below a turn off threshold voltage; and
turning off the secondary side switch when the voltage across the secondary side diode is above the turn off threshold.

21. The method of claim 14, wherein the one or more control parameters comprises at least one of: an output voltage, an output current, an output power, a protection mode, and an operating mode.

22. The method of claim 14, wherein causing the sequence of voltage pulses across the secondary side winding of the switching power converter representing the digital message comprises:
causing a pair of voltage pulses to be generated across the secondary winding within a predefined time period to represent a first logic state; and
causing a single voltage pulse to be generated across the secondary winding to represent a second logic state.

* * * * *